(12) United States Patent
Scott (10) Patent No.: US 7,334,600 B2
(45) Date of Patent: Feb. 26, 2008

(54) PRIMING APPARATUS FOR A CENTRIFUGAL PUMP

(75) Inventor: Thomas M. Scott, Lucas, OH (US)

(73) Assignee: The Gorman-Rupp Company, Mansfield, OH (US)

( * ) Notice: Subject to any disclaimer, the term of this patent is extended or adjusted under 35 U.S.C. 154(b) by 13 days.

(21) Appl. No.: 10/922,073

(22) Filed: Aug. 19, 2004

(65) Prior Publication Data

US 2005/0051211 A1 Mar. 10, 2005

(51) Int. Cl.
*F16K 33/00* (2006.01)

(52) U.S. Cl. .................. 137/202; 137/198; 137/448; 137/411; 137/422; 137/630.19; 417/200

(58) Field of Classification Search ............ 137/202, 137/198, 199, 434, 448, 411, 422, 628, 630.19, 137/614.21, 614.2, 436, 437, 627; 417/69, 417/200

See application file for complete search history.

(56) References Cited

U.S. PATENT DOCUMENTS

| | | | |
|---|---|---|---|
| 1,513,705 A * | 10/1924 | Haentjens | 417/200 |
| 1,551,362 A | 8/1925 | Barton | |
| 2,033,980 A * | 3/1936 | Durdin, Jr. | 417/200 |
| 2,033,981 A | 3/1936 | Durdin, Jr. | |
| 2,322,910 A | 6/1943 | Adney et al. | |
| 2,556,872 A * | 6/1951 | Deters | 137/422 |
| 2,801,592 A | 8/1957 | Barton | |
| 3,591,316 A * | 7/1971 | Piccirilli | 417/364 |
| 3,726,303 A | 4/1973 | Allen et al. | |

(Continued)

FOREIGN PATENT DOCUMENTS

GB 755 249 8/1956

(Continued)

OTHER PUBLICATIONS

"Pump Priming by Applied Vacuum", article from World Pumps, authored by A. Tynan, T Eng (CEI) MIMech TE, Dec. 1983.

(Continued)

*Primary Examiner*—John Rivell
*Assistant Examiner*—Craig Schneider
(74) *Attorney, Agent, or Firm*—Tarolli, Sundheim, Covell & Tummino, LLP (57) ABSTRACT

A vacuum assisted priming system for a fluid pump including a housing defining a hopper that communicates with a pump inlet. The housing mounts a first port that communicates with the source of vacuum and a second port that communicates with atmosphere. A check valve allows atmospheric air to flow into the housing under certain operating conditions but inhibits reverse flow. A valve member pivotally mounted within a valve chamber carries first and second sealing elements that are engageable with first and second seats. The lever arm is operatively connected to a float via a lost motion connection. When the fluid level in the hopper rises to a predetermined level, an actuating rod moves the lever arm to a first sealing position. When the fluid level falls to a predetermined level, the actuating rod moves the lever arm to a second sealing position. A baffle located at an inlet to the hopper reduces surging and turbulence in the hopper and defines a circuitous path through which the fluid must flow in order to enter the hopper.

17 Claims, 5 Drawing Sheets

U.S. PATENT DOCUMENTS

| | | |
|---|---|---|
| 3,904,319 A | 9/1975 | Paish et al. |
| 4,194,893 A | 3/1980 | Woodhouse et al. |
| 4,251,240 A | 2/1981 | Brennan et al. |
| 5,536,147 A | 7/1996 | Lang |
| 5,660,533 A | 8/1997 | Cartwright |
| 5,772,394 A | 6/1998 | Yokota et al. |
| 6,152,689 A | 11/2000 | Yokota et al. |
| 6,250,889 B1 | 6/2001 | Shepard |
| 6,315,524 B1 | 11/2001 | Muhs et al. |
| 6,409,478 B1 | 6/2002 | Carnes et al. |
| 6,575,706 B2 | 6/2003 | Carnes et al. |
| 6,616,427 B2 | 9/2003 | Carnes et al. |
| 6,692,234 B2 * | 2/2004 | Muhs ............... 417/199.2 |
| 6,783,330 B2 | 8/2004 | Carnes et al. |
| 2002/0114707 A1 * | 8/2002 | Carnes et al. ............... 417/200 |

FOREIGN PATENT DOCUMENTS

| | | |
|---|---|---|
| GB | 1048272 | 11/1966 |
| GB | 1050893 | 12/1966 |
| GB | 1 157 767 | 7/1969 |
| GB | 1 210 058 | 10/1970 |

OTHER PUBLICATIONS

"Self-Priming Equipment" operating instructions for 2" automatic priming pump from Sykes Univac, Henry Sykes Limited, London, Ontario Canada.

* cited by examiner

PRIMING APPARATUS FOR A CENTRIFUGAL PUMP

TECHNICAL FIELD

The present invention relates generally to pumps and, in particular, to pumps which use a vacuum source to aid or effect priming of the pump at start-up and/or to maintain the prime of the pump during its operation.

BACKGROUND ART

For at least some pumping applications which employ centrifugal pumps, a vacuum source connected at or near the inlet of the pump is used to aid or effect priming of the pump at start-up or to maintain the priming of the pump during its operation. One application of this type of centrifugal pump is in the pumping of sewage.

There are several methods for creating a source of vacuum for the centrifugal pump. One method utilizes an "eductor" which those skilled in the art will recognize as a device which uses high pressure air flowing through a venturi to create a source of vacuum. Another method of providing the required vacuum is the use of a vacuum pump. To effect priming of a pump, the vacuum source is placed in fluid communication with the pump inlet in order to remove air or other gases from the pump inlet. As the air/gas is removed, liquid is drawn into the inlet to replace the air/gas removed by the vacuum source; the centrifugal pump is then able to commence pumping of the liquid.

It should be apparent that it is undesirable for the pumpage to enter the vacuum system (often termed "carry over"). When a vacuum pump is used as a source of vacuum, it is easily damaged if the liquid being pumped, even if water, enters the pump.

Eductor-type systems are generally less sensitive to the ingestion of carry-over and may include apparatus for discharging carry-over drawn into the vacuum systems. If the carry-over is other than water, its discharge from the vacuum system may have to be carefully controlled. This is especially true of pumps used in sewage applications.

Efforts have been made to control the entry of liquid into the vacuum system. Many pumps of this type incorporate a float valve which closes off the vacuum passage when liquid in the priming chamber rises to a predetermined level.

It is believed that these prior efforts have not been entirely satisfactory. In actual operation, it has been found that surges occur in the fluid being pumped which cause abrupt changes in liquid level in the priming chamber. It is believed that the surging fluid can allow fluid from the priming chamber to enter the vacuum system. In some prior art pumps, provisions have been made for dealing with carry-over into the vacuum system by providing additional separating devices for recapturing the fluid entering the vacuum system and returning it to the pump. This adds unwanted expense to the pumping systems.

DISCLOSURE OF INVENTION

The present invention provides a new and improved vacuum assisted priming system which utilizes a float operated valve assembly for controlling the communication of a source of vacuum with the inlet side of a fluid pump, such as a centrifugal pump.

To facilitate the explanation, the present invention will be described in connection with a centrifugal pump, but it should be understood that the principles of this invention are equally applicable to other types of fluid pumps, such as positive displacement pumps and the present invention should not be limited to a centrifugal pump.

According to the invention, the vacuum assisted priming system includes a hopper that communicates with an inlet of a fluid pump to be primed. The housing that defines the hopper also defines or mounts a first port communicating with a source of vacuum and a second port communicating with atmosphere. A valve member is provided for controlling the communication of the first and second ports with an interior region defined by the housing. A check valve associated with the second port is operative to permit atmospheric air to flow through the second port and into the interior region under certain operating conditions, but inhibits air flow from the interior region to atmosphere (through the second port). A float located within the hopper is operatively connected to the valve member so that when the fluid level in the hopper rises to a predetermined level, the valve member terminates communication of the first port with the interior region. When the fluid level falls to a predetermined level, the valve member terminates the communication of the second port with the interior region.

According to a feature of the invention, the float located within the hopper is operatively connected to the valve member through a lost motion connection so that a dead band is provided whereby movement in the float does not produce movement in the valve member when the fluid level in the hopper is at an intermediate level.

In the preferred and illustrated embodiment, the valve member includes a pivotally mounted lever that is operatively connected to the actuating rod. The lever carries a first sealing element engageable with a valve seat forming part of the first port when the lever arm is moved to a first sealing position by the float. The lever arm also carries a second sealing element engageable with a seat forming part of the second port. The second sealing element engages the seat of the second port when the lever arm is moved to a second sealing position by the float.

In a more preferred embodiment, the valve member is located within a valve chamber that forms part of the housing. The valve chamber fully encloses the valve member and associated sealing elements. The interior of the valve chamber communicates with the hopper through cross passages formed in the walls of the valve chamber. According to this preferred embodiment, the valve chamber wall defines a splash shield located below the cross passages. The splash shield includes transversely extending structure which inhibits fluid carryover from the hopper into the valve chamber.

According to another feature of the invention, the check valve that controls the communication of atmosphere with the interior of the housing forms part of the second port.

In the preferred and illustrated embodiment, the actuating rod, which is attached to the float, includes a stem portion located at its upper end that is positioned between a pair of spaced apart abutments. The lever arm includes structure at one end that is engage able by the abutments. The stem portion provides the lost motion connection between the actuating rod and the lever arm so that movement in the actuating rod does not produce attendant movement in the lever arm unless the lever arm is engaged by one of the abutments.

According to still another feature of the invention, a baffle is located at an inlet to the hopper and is operative to reduce surging and turbulence in the hopper. The baffle includes a support plate that defines openings that communicate the inlet of the pump with the hopper. A spider-like flow diverter overlies the openings in the support plate. The flow diverter has downwardly depending tabs that are attached to the support plate which, together with the support plate, define transverse openings through which fluid from the pump inlet must flow in order to enter the hopper. The circuitous path that defined by the baffle reduces the incidence of surging and turbulence in the hopper. It also reduces abrupt changes in fluid level in the hopper.

Additional features of the invention and a fuller understanding will be obtained in reading the following detailed description made in connection with the accompanying drawings.

BEST MODE FOR CARRYING OUT THE INVENTION

Figure 1:
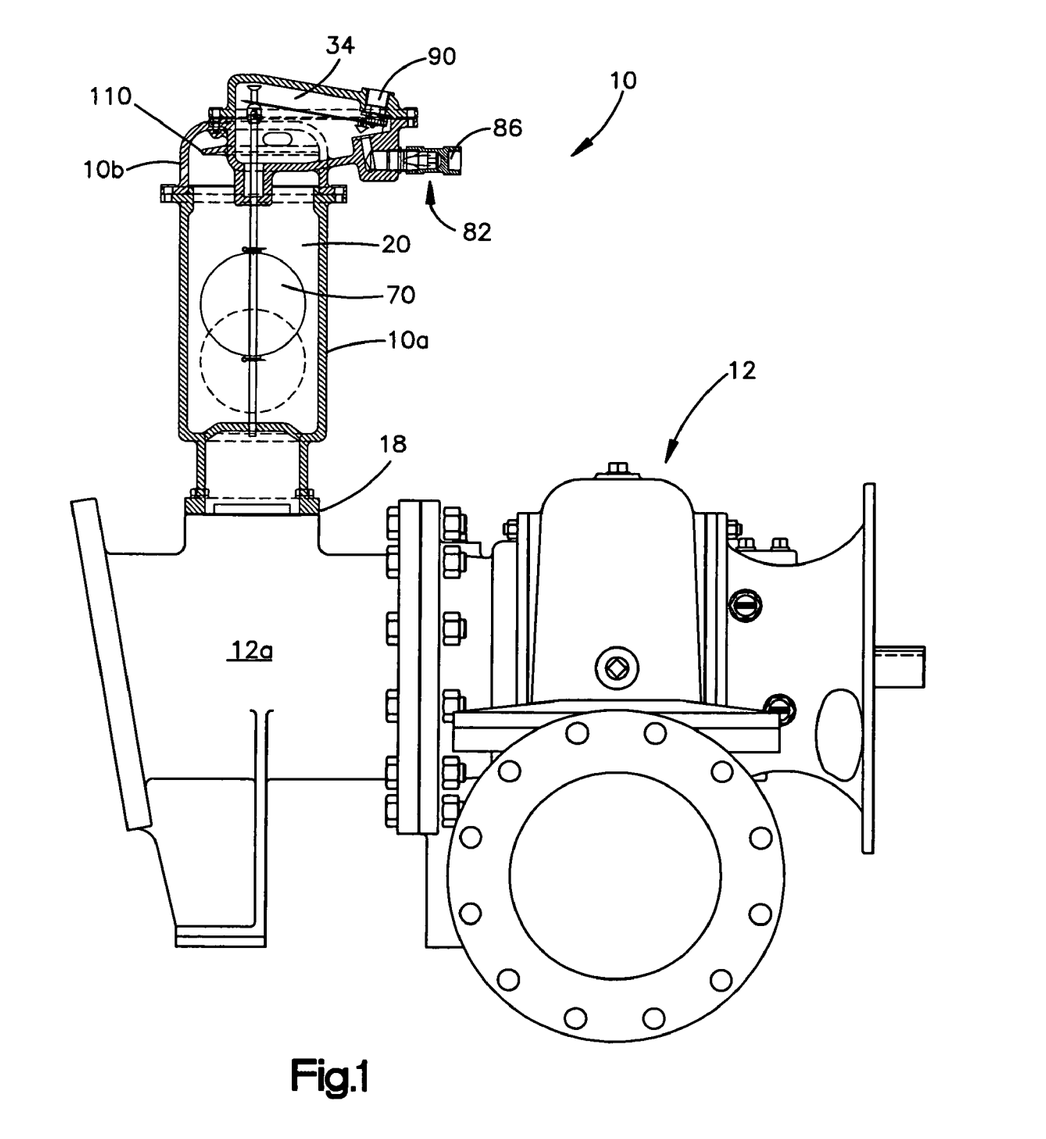
FIG. 1 is a side elevational view, partially in section, showing a priming unit constructed in accordance with the preferred embodiment of the invention and attached to a centrifugal pump.
Figure 2:
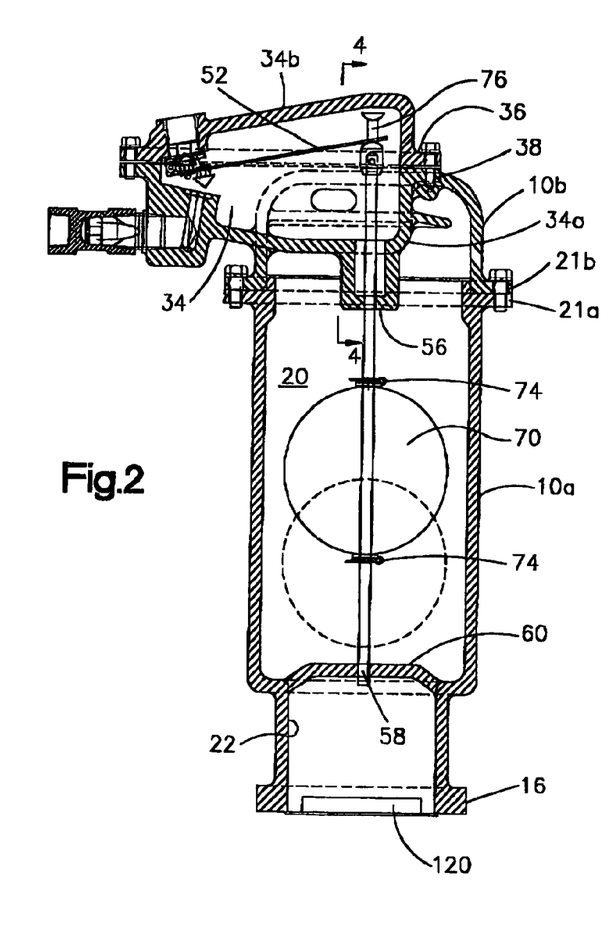
FIG. 2 is a sectional view of the priming unit shown in FIG. 1.

FIG. 1 shows the overall construction of a vacuum assisted priming unit 10 embodying the present invention. In the preferred and illustrated embodiment, the priming unit 10 is self contained and is attachable to the suction inlet 12a of a pump, such as a centrifugal pump 12. Referring also to FIG. 2, the unit 10 includes a mounting flange 16 defining a plurality of mounting holes. The flange 16 is bolted to a mating flange 18 on the pump 12 which typically forms part of the pump inlet 10. Other mounting arrangements, however, are contemplated by the present invention. Accordingly, this invention should not be limited to one in which mating flanges are used to mount the apparatus, nor should the invention be limited to the illustrated mounting configuration and the location of the priming unit 10.

The priming unit 10 includes upper and lower housing members 10a, 10b having respective mating flanges 21a,21b that are bolted together. The housing member 10a defines a float chamber or vacuum hopper 20 which communicates with a conventional inlet flow passage (defined by the inlet 12a) via a suction hole or transfer passage 22. The upper priming unit housing member 10b serves as a cap for the float chamber 20 and, at least partially defines an auxiliary valve chamber 34. In the preferred embodiment, a lower portion 34a of the valve chamber 34 is integrally cast with the upper housing member or cap 10b. The valve chamber 34 is then completed by a valve chamber cover 34b having a peripheral flange 36 that mates with a similarly configured flange 38 defined by the cap 10b. Bolts 35 secure the components 34a, 34b together.

Figure 5:
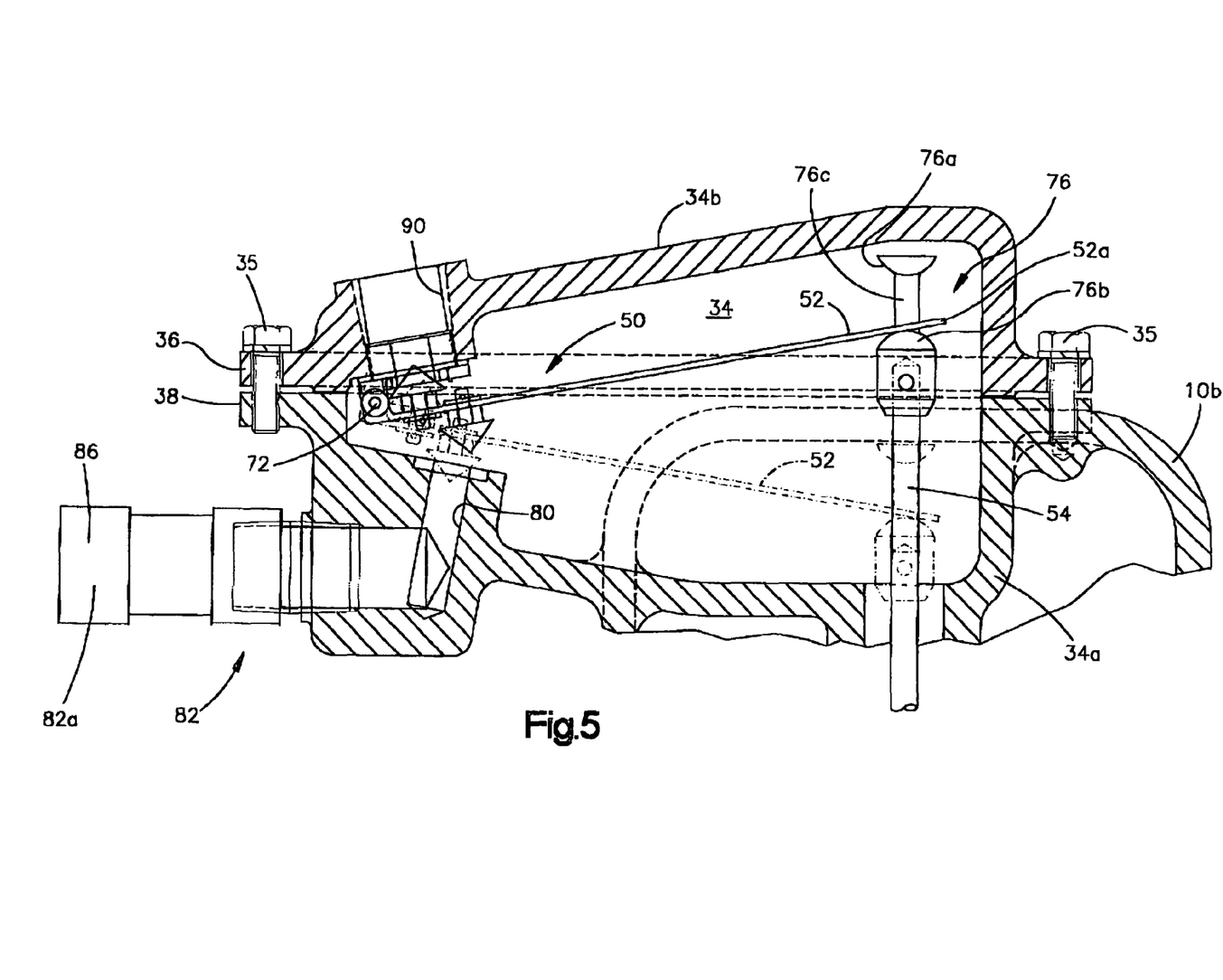
FIG. 5 is a fragmentary sectional view of an upper portion of the priming unit.
Figure 6:
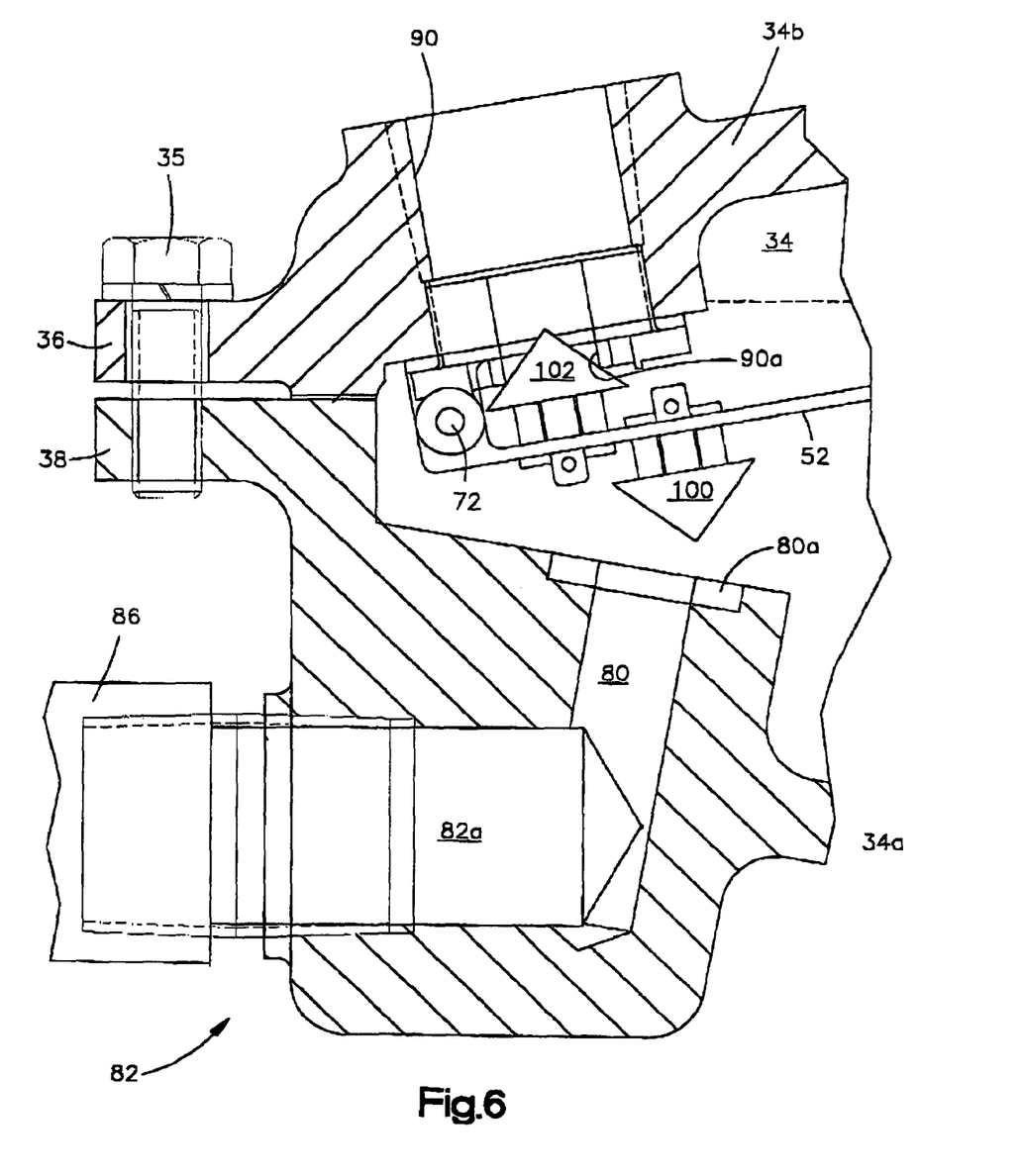
FIG. 6 is an enlarged fragmentary view of the upper portion of the priming unit.

Referring also to FIGS. 5 and 6, the auxiliary valve chamber 34 houses a valving member indicated generally by the reference character 50. The valving member includes a lever arm 52 that is operatively connected to a plunger rod 54. The plunger 54 rod is guided for vertical, reciprocating movement by an upper guide hole 56 defined by the lower valve chamber housing portion 34a and a lower guide hole 58 formed in a transverse rib 60 integrally cast with the lower housing 10a (see FIG. 2). A spherical float 70 is captured on the plunger rod 54 by retainers 74 which, in some embodiments, may be adjustable.

The lever arm 52 is pivotally attached to the chamber cover 34b by a pin 72 (shown best in FIG. 5). A distal end 52a of the lever arm 52 is mechanically coupled to an actuator member 76 which is fixed (as by a pin) to the top of the plunger rod 54. The actuating member 76 define respective upper and lower abutments 76a, 76b, spaced apart by a stem 76c. In the preferred embodiment, the distal end 52a of the lever arm 52 includes a slot or other opening which is adapted to slidingly receive the stem 76c.

As should be apparent, the position of the actuating member 76 within the valve chamber 34 is a function of the position of the float 70. As the float rises, the lower abutment 76b will contact and move the lever arm 52 upwardly (as viewed in FIG. 5). Conversely, as the level of liquid in the float chamber 20 falls, the upper abutment 76a will contact the lever arm 52 and move it downwardly. The stem 76c provides a lost motion connection or "dead band" which requires a predetermined change in float level before the lever arm 52 is contacted and moved.

Referring, in particular, to FIGS. 5 and 6, the lower valve chamber housing member 34a defines an atmospheric port 80. The port 80 communicates with atmosphere through a fitting indicated generally by the reference character 82. In the preferred embodiment, the fitting includes a check valve 82a which allows atmospheric air to flow from an atmospheric inlet 86 and into the chamber 34 via the port 80. The check valve, however, inhibits the flow of air from the chamber 34 to the inlet 86. In the preferred embodiment, the check valve opens upon a pressure differential of 0.5 psi.

The valve chamber cover 34b defines a vacuum port 90. The port 90 may be connected to a conventional vacuum source, such as a vacuum pump or a vacuum eductor. Those skilled in the art will recognize that an eductor-type vacuum source utilizes a source of air pressure and an venturi to generate a vacuum.

The atmospheric port 80 includes a valve seat 80a. Similarly, the vacuum port 90 includes a valve seat 90a.

As seen best in FIG. 6, the lever arm 52 mounts a pair of poppet valves 100, 102. The poppet 100 controls the communication of the atmospheric port 80 with the chamber 34; whereas the poppet valve 102 controls the communication of the vacuum source (via the vacuum port 90) with the valve chamber 34.

Referring also to FIG. 5, when the lever arm is moved downwardly by the actuating member 76 to the phantom position shown in FIG. 5, the atmospheric port 80 is sealed by the lower poppet 100 and, as a result, atmospheric air is inhibited from flowing into the chamber 34. When the lever arm 52 is moved to its upper position (shown in solid lines in FIG. 5), the upper poppet 102 engages the valve seat 90a of the vacuum port and seals the vacuum source from the vacuum chamber 34. In operation, the vacuum source tends to maintain engagement of the poppet 102 with the seat 90a once the poppet engages the seat.

In the preferred and illustrated embodiment, the configuration of the poppets 102, 100 and the locations of their associated seats 90a, 80a are such that there is a range of travel in the lever arm 52 during which neither poppet 102, 100 is fully seated in its associated seat. In other words, in some intermediate positions of the lever arm, both the atmospheric port 80 and the vacuum port 90 are concurrently in partial communication with the chamber 34. It should be noted that the invention also contemplates a poppet/seat arrangement in which as one poppet becomes unseated from its associated valve seat, the other poppet is at least beginning to engage its associated seat. In this latter arrangement, there would not be a position of the lever arm 52 at which both ports 80, 90 are simultaneously communicating with the chamber 34.

Figure 3:
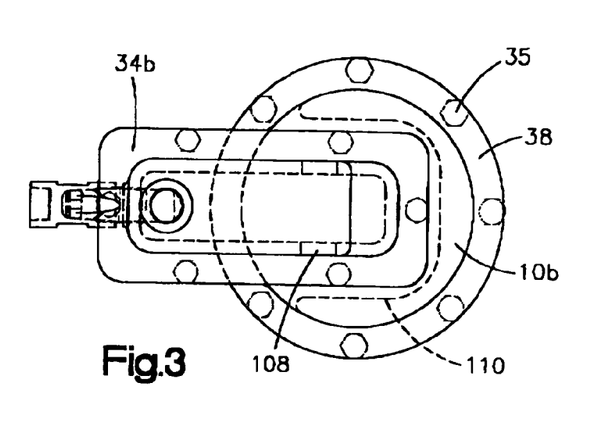
FIG. 3 is a top elevational view of the priming unit shown in FIG. 2.

As should be apparent, when the lower poppet 100 engages the atmospheric port 80, the vacuum source is operative to draw air from the valve chamber 34 and hence the vacuum chamber 20 with which it communicates. In the preferred and illustrated embodiment, the valve chamber 34 communicates with the vacuum chamber or hopper 20 via transverse passages or openings 108 (shown best in FIGS. 3 and 4) that are formed in the side walls of the lower portion 34a of the valve chamber 34.

When the upper poppet 102 engages the seat 90a of the vacuum port 90, the vacuum source is in effect rendered ineffective and atmospheric air is allowed to enter the valve chamber 34. When the upper poppet valve 102 engages the seat 90a, the priming function is turned off or disabled.

It has been found that under some circumstances surges due to fluctuations in pump operation can cause the level of the liquid in the pump chamber 20 to rise unexpectedly. The check valve 82a in the atmospheric port inhibits this uncontrolled rise since, in order for liquid to rise in the float chamber 20, air must be expelled. The check valve 82a prevents this air from being expelled when the poppet 102 is sealing the vacuum port, thus creating an air cushion above the liquid level.

To further reduce carry-over into the vacuum port, a splash shield 110 (shown best in FIG. 4) is positioned around the lower valve chamber housing 34a. Preferably the shield 110 is fin-like and is integrally cast in the upper housing 10b along with the lower valve chamber housing 34a.

Figure 4:
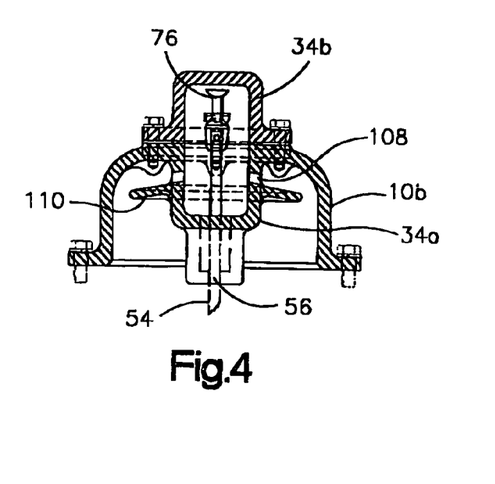
FIG. 4 is a fragmentary sectional view as seen from the plane indicated by the line 4-4 in FIG. 2.

As seen best in FIG. 4, the splash shield 110 extends transversely and is located just below the passages 108 through which the hopper 20 communicates with the valve chamber 34. The lateral orientation of the communicating passages 20 coupled with the transverse extension of the splash shield inhibits fluid in the hopper 20 from being carried into or splashed into the valve chamber 34. As explained above, fluid or other material carried into the valve chamber 34 could enter the vacuum system via the vacuum port 90 (when opened) which is undesirable.

Figure 7:
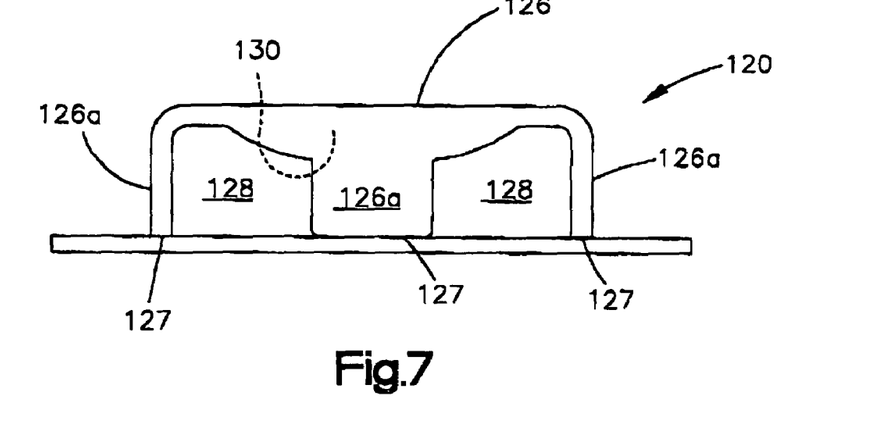
FIG. 7 is a side elevational view of a baffle forming part of the priming unit; and, FIG. 8 is a top plan view of the baffle shown in FIG. 7.
Figure 8:
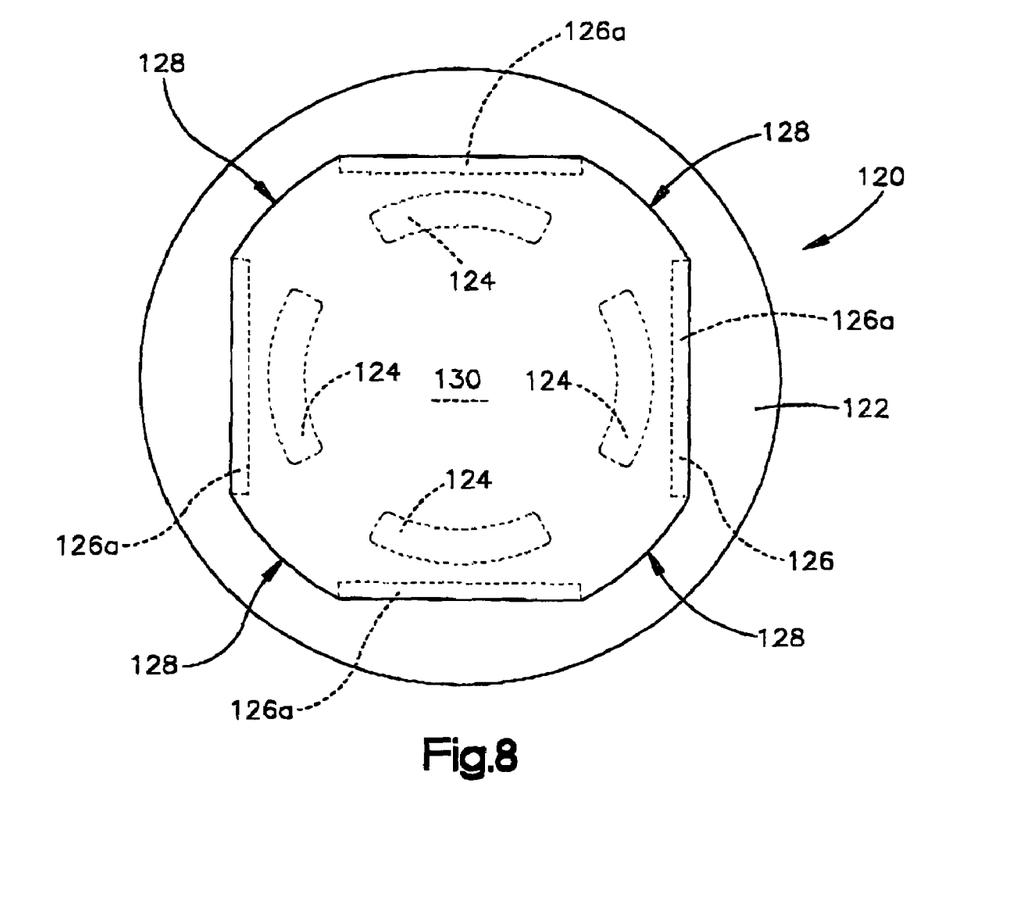

Referring to FIG. 2, in the preferred embodiment, a baffle 120 is mounted in the transfer passage 22. The baffle reduces fluid surges into the hopper 20 due to abrupt changes in inlet flow conditions. FIGS. 7 and 8 illustrate the construction of the baffle. The baffle includes a support plate 122 which is preferably secured between the priming unit flange 16 and the pump flange 18. The plate 122 includes a plurality of arcuate slots 124. In the illustrated embodiment, four slots are utilized. A spider-like flow diverter 126 is secured to the plate 122 and overlies the slots, as best shown in FIG. 8.

The spider-like element 126 includes four downwardly depending tabs 126a, the lower edges 127 of which, are secured to the plate 122 as by welding or other bonding methods. As seen best in FIG. 7, the spider-like flow diverter element 126 end defines four lateral openings 128 which communicate a center portion 130 of the mounting plate 122 (where the elongate arcuate slots 124 are formed) with a peripheral region of the plate. In operation, fluid from the inlet 12a flows in an axial direction through the slots 124 into the region defined between the plate 122 and the underside of the spider element 126. From there the fluid must flow somewhat laterally in order to enter the hopper 20.

As a result of the circuitous path defined by the baffle 120, fluctuations in flow conditions in the inlet 12a do not produce sudden and abrupt fluid level changes in the hopper 20. The baffle 120 acts to dampen sudden and temporary inflows of fluid from the inlet 12a into the hopper 20. The baffle 120 also reduces turbulence in the hopper 20, which is generally caused by variations in the flow conditions at the inlet 12a. The reduction in hopper turbulence reduces splashing within the hopper that otherwise could result in carryover into the vacuum system.

Although the invention has been described with a certain degree of particularity it should be understood that those skilled in the art can make various changes to it without departing from the spirit or scope of the invention as hereinafter claimed.

I claim:

1. A vacuum assisted priming system for a fluid pump, comprising:
a) structure defining a hopper communicating with an inlet of said fluid pump;
b) said structure defining a first port communicating with a source of vacuum and a second port communicating with atmosphere;
c) a valve member for controlling the communication of said first and second ports with an interior region defined by said structure;
d) a check valve operative to permit atmospheric air outside said structure to flow through said second port and into said interior region under certain operating conditions and further operative to inhibit air flow from said interior region to the outside of said structure through said second port;
e) a float located within said hopper and operatively connected to said valve member such that when a fluid level in said hopper rises to a predetermined level, said valve member terminates communication of said first port with said interior region and when said fluid level falls to a predetermined level, said valve member terminates the communication of said second port with said interior region; and
f) wherein said float is operatively connected to said valve member using a lost motion connection.

2. The system of claim 1 wherein said valve member comprises a pivotally mounted lever that is operatively connected to an actuating rod forming part of said float and said lever carrying said first sealing element, said first sealing element engaging said valve seat forming part of said first port when said lever arm is moved to a first sealing position by said float and said lever further carrying a second sealing element engageable with a seat forming part of said second port when said lever arm is moved to a second sealing position by said float.

3. The system of claim 2 wherein said actuating rod includes a stem portion located between a pair of spaced apart abutments and said lever arm includes structure engageable by said abutments, said stem providing a dead band whereby movement in said actuating rod does not produce attendant movement in said lever arm until said actuating rod engages one of said abutments.

4. The apparatus of claim 3 further including a baffle element located at an inlet to said hopper and including a support plate and a spider-like flow diverter overlying apertures in said support plate, said flow diverter defining transverse openings through which fluid from a pump inlet must flow in order to enter said hopper.

5. The system of claim 1 wherein said valve member is located within a valve chamber forming part of said structure, said valve chamber communicating with said hopper through cross passages formed in said valve chamber.

6. The apparatus of claim 5 wherein said valve chamber defines a splash shield located below said cross passages, said splash shield including transversely extending structure which inhibits fluid carryover into said valve chamber.

7. The system of claim 1 wherein said check valve forms part of said first port.

8. A vacuum assisted priming system for a fluid pump, comprising:
   a) structure defining a hopper communicating with an inlet of said fluid pump;
   b) said structure defining a first port communicating with a source of vacuum and a second port communicating with atmosphere;
   c) a valve member for controlling the communication of said first and second ports with an interior region defined by said structure;
   d) a check valve for permitting atmospheric air to flow through said second port and into said interior region under certain operating conditions and for inhibiting air flow from said interior region to atmosphere through said second port; and,
   e) a float located within said hopper and operatively connected to said valve member such that when a fluid level in said hopper rises to a predetermined level, said valve member terminates communication of said first port with said interior region and when said fluid level falls to a predetermined level, said valve member terminates the communication of said second port with said interior region, said float being operatively connected to said valve member using a lost motion connection.

9. The system of claim 8 wherein said valve member is located within a valve chamber forming part of said structure, said valve chamber communicating with said hopper through cross passages formed in said valve chamber.

10. The system of claim 8 wherein said valve member comprises a pivotally mounted lever that is operatively connected to an actuating rod forming part of said float and said lever carries a first sealing element engage able with a valve seat forming part of said first port when said lever arm is moved to a first sealing position by said float and further carries a second sealing element engage able with a seat forming part of said second port when said lever arm is moved to a second sealing position by said float.

11. The system of claim 10 wherein said actuating rod includes a stem portion located between a pair of spaced apart abutments and said lever arm includes structure engage able by said abutments, said stem providing a dead band whereby movement in said actuating rod does not produce attendant movement in said lever arm until said actuating rod engages one of said abutments.

12. The apparatus of claim 11 further including a baffle element located at an inlet to said hopper and including a support plate and a spider-like flow diverter overlying apertures in said support plate, said flow diverter defining transverse openings through which fluid from a pump inlet must flow in order to enter said hopper.

13. A vacuum assisted priming system for a fluid pump, comprising:
   a) structure defining a hopper communicating with an inlet of said fluid pump;
   b) said structure defining a first port communicating with a source of vacuum and a second port communicating with atmosphere;
   c) a valve member for controlling the communication of said first and second ports with an interior region defined by said structure;
   d) a check valve for permitting atmospheric air to flow through said second port and into said interior region under certain operating conditions and for inhibiting air flow from said interior region to atmosphere through said second port,
   e) a float located within said hopper and operatively connected to said valve member such that when a fluid level in said hopper rises to a predetermined level, said valve member terminates communication of said first port with said interior region and when said fluid level falls to a predetermined level, said valve member terminates the communication of said second port with said interior region; and,
   f) wherein said valve member comprises a pivotally mounted lever that is operatively connected to an actuating rod forming part of said float and said lever carries a first sealing element engage able with a valve seat forming part of said first port when said lever arm is moved to a first sealing position by said float and further carries a second sealing element engage able with a seat forming part of said second port when said lever arm is moved to a second sealing position by said float.

14. The system of claim 13 wherein said float is operatively connected to said valve member using a lost motion connection.

15. The system of claim 13 wherein said valve member is located within a valve chamber forming part of said structure, said valve chamber communicating with said hopper through cross passages formed in said valve chamber.

16. The system of claim 13 wherein said actuating rod includes a stem portion located between a pair of spaced apart abutments and said lever arm includes structure engage able by said abutments, said stem providing a dead band whereby movement in said actuating rod does not produce attendant movement in said lever arm until said actuating rod engages one of said abutments.

17. The apparatus of claim 16 further including a baffle element located at an inlet to said hopper and including a support plate and a spider-like flow diverter overlying apertures in said support plate, said flow diverter defining transverse openings through which fluid from a pump inlet must flow in order to enter said hopper.

* * * * *